United States Patent Office 3,621,674
Patented Nov. 23, 1971

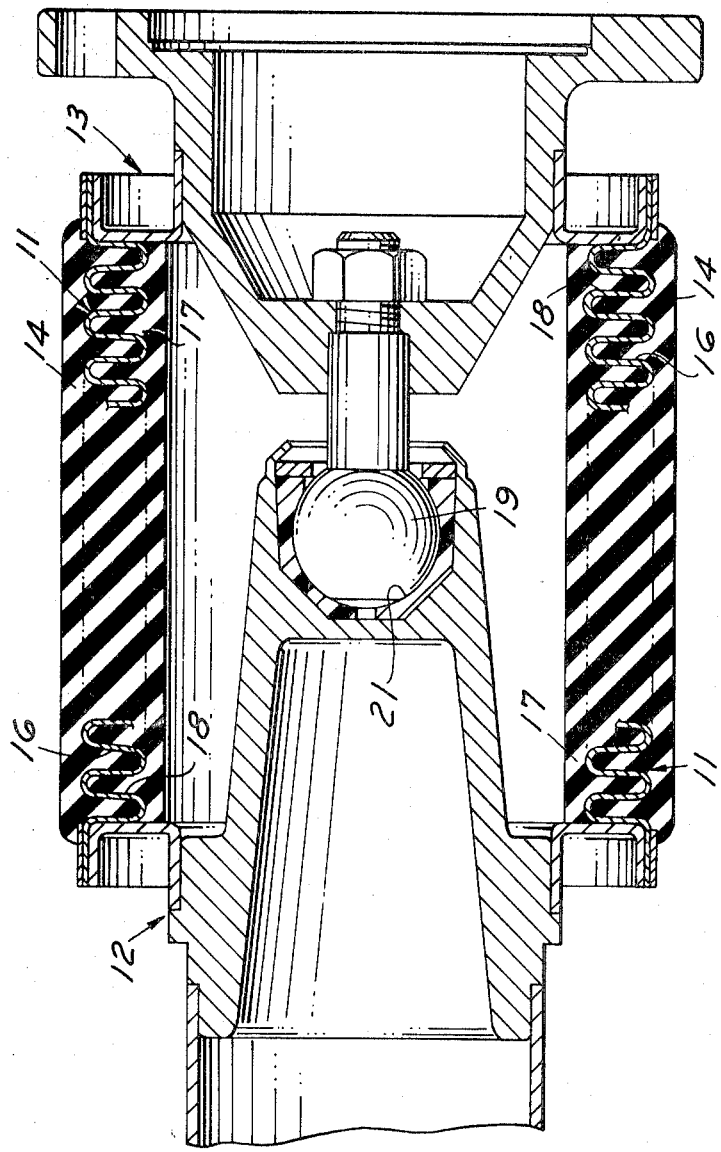

3,621,674
REINFORCED BELLOWS UNIVERSAL JOINT
George Ulics, Plymouth, and Donald G. Wheatley, Orchard Lake, Mich., assignors to Ford Motor Company, Dearborn, Mich.
Filed Sept. 26, 1969, Ser. No. 861,329
Int. Cl. F16d 3/28
U.S. Cl. 64—11 B                                6 Claims

ABSTRACT OF THE DISCLOSURE

A universal joint assembly including a flexible, cylindrical torque transfer bellows which is reinforced by an elastomeric stiffener material received within the bellows grooves. The elastomeric material increases the torque capacity of the bellows by reducing torsional windup under high torque loads.

BACKGROUND OF THE INVENTION

A common universal joint used to transmit motion between two angularly misaligned rotating shafts is the simple Cardan joint. There are, however, many applications in which the Cardan joint is not well suited. One such application is where the nonuniform motion transmission characteristics of the Cardan joint provide unacceptable velocity variations between the input and the output shafts. Another such application is where the weight or size of the joint is of primary importance. Many essentially constant velocity joints are presently available but are often too cumbersome or too expensive for many applications where substantially constant velocity is desired.

It has been found that a cylindrical bellows positioned between two end members provides a substantially constant velocity flexible coupling for rotating shafts at relatively low torque loads. In contrast, this invention provides a bellows universal joint assembly which is now capable of transmitting significantly higher torque loads at high speeds and at substantially constant velocity. This invention further provides a bellows type universal joint which is relatively flexible in longitudinal bending and stiff in torsional bending, and in which the torsional windup in the bellows at high torque loads is significantly reduced. Further, this invention provides a universal joint assembly which is economical to produce and reliable in operation. This invention also provides a flexible coupling which can be made axially compact in proportion to the smallness of the angle between the rotating shafts. Still further, this invention provides a universal joint which is completely enclosed and unaffected by dirt and which has no rolling or sliding friction.

BRIEF SUMMARY OF THE INVENTION

A flexible coupling constructed in accordance with this invention includes a cylindrical bellows interconnecting a pair of rotatable members. The bellows includes a plurality of annular grooves into which elastomeric material is received.

BRIEF DESCRIPTION OF THE DRAWING

The drawing shows a cross-sectional view of a bellows universal joint assembly embodying the invention.

DETAILED DESCRIPTION OF A PREFERRED EMBODIMENT

In the preferred embodiment, a metal cylindrical bellows 11 is fastened to and interconnects a pair of rotatable annular end members 12 and 13, as shown in the drawing. The bellows may be constructed of stainless steel of a thickness dependent upon the load to be carried, Elastomeric material 14 is received about the cylindrical bellows and is molded into each annular groove or convolution 16. Similarly, elastomeric material 17 is positioned within the radially inner surface of the cylindrical bellows and into the radially inwardly opening grooves or convolutions 18 of the bellows. The bellows wall is thus sandwiched between two layers of elastomeric material.

A ball and socket centering device may be provided to fix the point of intersection of the rotatable end members 12 and 13. When such a centering device is provided, the ball member 19 is rigidly fixed to one of the end members and the socket member 21 is rigidly fixed to the other of the end members. The point of rotation is preferably at the axial midpoint of the cylindrical bellows.

It should be noted that the joint assembly may be used with the elastomeric material about only the outside or, alternatively, about only the inside surface of the bellows. When the elastic material is molded about the radially outer surface of the cylindrical bellows, it provides a protective covering against a bump in addition to increasing bending stiffness and reducing torsional windup of the bellows. The hardness of the elastomer is determined as a function of the maximum angle between the rotating shafts and the amount of torque to be carried by the joint assembly.

As an alternative to the one-piece elastomeric member received about the outside or inside surface of the bellows, as shown in the drawing, a construction utilizing a series of separate elastomeric rings received individually within the several grooves is also intended to be within the scope of the invention.

It should also be noted that the bellows 11 may be formed from single layer metal stock as shown in the drawing, or of multilayer stock, which is generally capable of accommodating higher torque loads and greater operating angles.

We claim:
1. A flexible torque transfer assembly comprising:
a rotatable driving member and a rotatable driven member,
flexible means interconnecting said driving member and said driven member constructed to transmit torque and rotary motion between said members,
said flexible means permitting angular displacement of the driven member relative to the driving member from an axially aligned position to various positions of axial misalignment,
said flexible means including a cylindrical bellows interconnecting and secured to said driving member and said driven member, said bellows having a plurality of grooves formed therein, and
means to reduce torsionally induced stresses within and deformation of said bellows comprising elastomeric material received within the grooves of said bellows.
2. A flexible torque transfer assembly according to claim 1, said elastomeric material at least substantially filling the grooves of said bellows.
3. A flexible torque transfer assembly according to claim 1, said elastomeric material being received within said grooves and about and within said cylindrical bellows whereby the wall of said bellows is sandwiched between two generally cylindrical layers of said elastomeric material.
4. A flexible torque transfer assembly according to claim 1,
ball means secured to one of said rotatable members,
socket means secured to the other of said rotable members,
said ball means pivotally engaging said socket member thereby fixing the point of intersection of the axes of rotation of said rotatable members.

5. A flexible torque transfer assembly comprising:
a rotatable driving member and a rotatable driven member,
flexible means interconnecting said driving member and said driven member constructed to transmit torque and rotary motion between said members,
said flexible means permitting angular displacement of the driven member relative to the driving member from an axially aligned position to various positions of axial misalignment,
said flexible means including a cylindrical bellows interconnecting and secured to said driving member and said driven member, said bellows having a plurality of radially inwardly opening grooves formed therein, and
means to reduce torsionally induced stresses within and deformation of said bellows comprising elastomeric material received within said grooves of said bellows.

6. A flexible torque transfer assembly comprising:
a rotatable driving member and a rotatable driven member,
flexible means interconnecting said driving member and said driven member constructed to transmit torque and rotary motion between said members,
said flexible means permitting angular displacement of the driven member relative to the driving member from an axially aligned position to various positions of axial misalignment,
said flexible means including a cylindrical bellows interconnecting and secured to said driving member and said driven member, said bellows having a plurality of radially outwardly opening grooves formed therein, and
means to reduce torsionally induced stresses within and deformation of said bellows comprising elastomeric material received within said grooves of said bellows.

References Cited

UNITED STATES PATENTS

| | | | |
|---|---|---|---|
| 1,910,880 | 5/1933 | Blake | 64—13 |
| 2,755,643 | 7/1956 | Wildhaber | 64—32 |
| 3,368,835 | 2/1968 | Hackford | 64—11 |

BENJAMIN W. WYCHE, Primary Examiner

R. HEALD, Assistant Examiner